United States Patent [19]

Tobias

[11] 3,898,624

[45] Aug. 5, 1975

[54] DATA PROCESSING SYSTEM WITH VARIABLE PREFETCH AND REPLACEMENT ALGORITHMS

[75] Inventor: Richard J. Tobias, Santa Clara, Calif.

[73] Assignee: Amdahl Corporation, Sunnyvale, Calif.

[22] Filed: June 14, 1973

[21] Appl. No.: 369,900

[52] U.S. Cl. .......... 340/172.5

[51] Int. Cl. .... G06f 7/28; G06f 13/08; G05b 13/02

[58] Field of Search .......... 340/172.5

[56] References Cited

UNITED STATES PATENTS

| | | | |
|---|---|---|---|
| 3,588,829 | 6/1971 | Boland et al. | 340/172.5 |
| 3,588,839 | 6/1971 | Belady et al. | 340/172.5 |
| 3,647,348 | 3/1972 | Smith et al. | 340/172.5 |
| 3,693,165 | 9/1972 | Reiley et al. | 340/172.5 |

*Primary Examiner*—Paul J. Henon
*Assistant Examiner*—Jan E. Rhoads
*Attorney, Agent, or Firm*—Flehr, Hohbach, Test, Albritton & Herbert

[57] ABSTRACT

A data processing system using a high speed buffer storage to interface main storage with a central processing unit. Algorithms for the purpose of prefetching the next sequential line from main storage to the high speed buffer and for replacement of existing lines in the high speed buffer may be dynamically modified relative to the type of program being executed by the use of a system console unit.

7 Claims, 7 Drawing Figures

ALGORITHM FLOW CHART

ALGORITHM
FLOW CHART

| PRI LOC | ALT LOC | REQ | OSR RPLC PROB | OSR RPLC SUPV | PR | CONT | ALT |
|---|---|---|---|---|---|---|---|
| 0 | 0 | X | X | X | | C | |
| 0 | 1 | 0 | X | 0 | | | A |
| 0 | 1 | 0 | X | 1 | P | | |
| 0 | 1 | 1 | 0 | X | P | | |
| 0 | 1 | 1 | 1 | X | | | A |
| 1 | 0 | 0 | X | 0 | P | | |
| 1 | 0 | 0 | X | 1 | | | A |
| 1 | 0 | 1 | 0 | X | | | A |
| 1 | 0 | 1 | 1 | X | P | | |
| 1 | 1 | X | X | X | | C | |

DATA PROCESSING SYSTEM WITH VARIABLE PREFETCH AND REPLACEMENT ALGORITHMS

BACKGROUND OF THE INVENTION

The present invention relates to a data processing system with variable prefetch and replacement algorithms.

In a large scale computer, efficiency is enhanced by providing a high speed buffer storage unit between the relatively large main storage unit (MS) and the central processing unit (CPU). In order to reduce the waiting time of the CPU the assumption is made that if one line of data has been requested from MS by the CPU then the next sequential line will also be needed. Therefore, computers with buffered storage have had a prefetch capability; that is, when one line was requested from MS the next sequential line was automatically transferred to high speed buffer storage before any explicit request.

The disadvantage of the foregoing procedure was its ability to take into account conditions that would not justify the basic assumption that the next sequential line should always be prefetched immediately. For example, in the I/O channel of the computer, the use of a relatively low data rate card reader does not require prefetching and, therefore, the high speed buffer storage unit should be freed for other uses. On the other hand, interaction with a drum memory requires a high data rate and better performance is obtained when immediate prefetching occurs.

A related problem concerns the replacement of modified lines of data in the high speed buffer unit. Since the buffer memory is, of course, smaller than MS several lines of MS will be assigned to the same predetermined location in the primary and alternate portions of the buffer memory. When bringing a line into the buffer from MS either on an explicit fetch or a prefetch basis a decision must be made where to put the line; if both possible locations are full a decision must be made as to which line of existing data will be replaced.

Prior data processing systems have not effectively solved the foregoing problems in a manner which maintains the efficiency of the system.

OBJECT AND SUMMARY OF THE INVENTION

It is, therefore, an object of the present invention to provide an improved data processing system with variable prefetch and replacement algorithms.

In accordance with the above object there is provided a data processing system comprising a central processing unit (CPU), main storage (MS), and a high speed buffer unit (SU) coupling the CPU to MS. Means are responsive to a program controlling the CPU for varying an algorithm which controls the relationship between the MS and SU.

DETAILED DESCRIPTION OF THE PREFERRED EMBODIMENT

Figure 1:
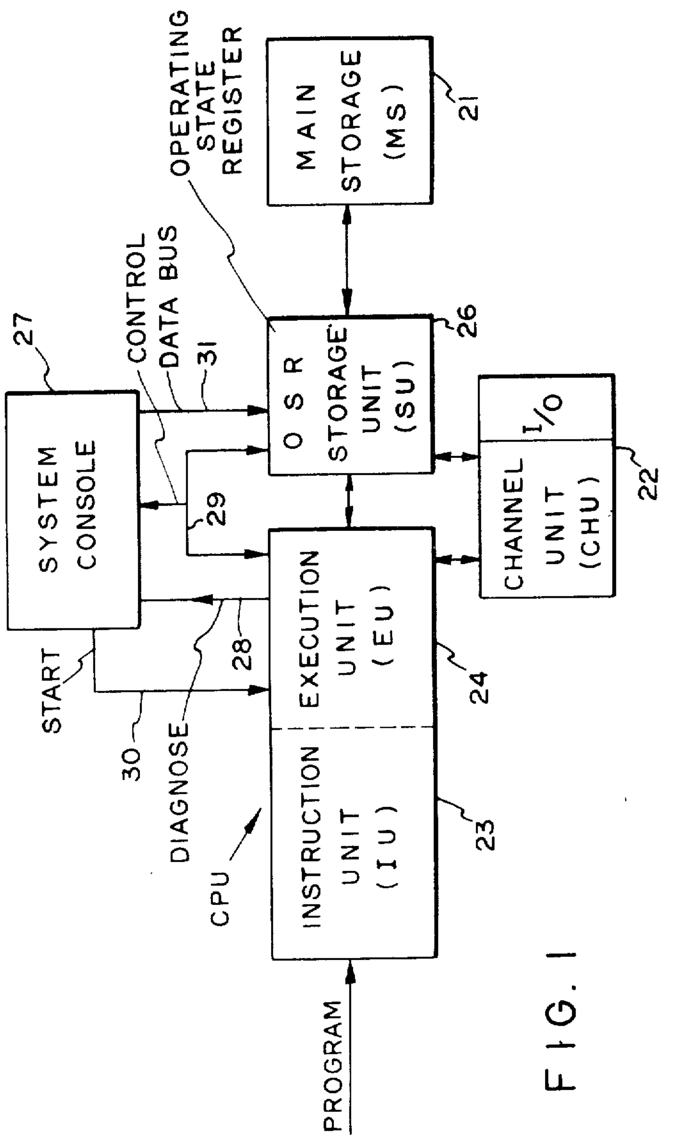
FIG. 1 is a block diagram of a data processing system embodying the present invention.

FIG. 1 illustrates a block diagram which is for the most part typical of a large scale computer. It includes a main storage unit (MS) 21, a channel unit (CHU) 22 associated with an input/output or I/O interface, a central processing unit (CPU) which includes an instruction unit (IU) 23 and an execution unit (EU) 24, and a high speed buffer storage unit (SU) 26 which includes an operating state register designated OSR which substantially controls its operation. Moreover, in accordance with the invention a system console 27 is provided which would normally be in the form of a minicomputer such as a Nova, PDP 8 or Hewlett Packard brands. The CPU, via a programmed DIAGNOSE instruction, can signal the system console 27 to take supervisory control of the CPU and the storage unit. Once the system console obtains control, bits of information are transmitted across the data bus 31 and placed in the operating state register (OSR) of the storage unit 26. The system console via the START line 30 can then return supervisory control to the CPU and the storage unit.

In operation the system of FIG. 1 operates in a well-known manner under control of instructions where an organized group of instructions form a program. The instructions and the data upon which the instructions operate are introduced from the I/O equipment via the channel unit 22 through the storage unit 26 and its associated control structure and into main storage 21. From MS 21 instructions are fetched by the instruction unit 23 through storage unit 26 and are processed so as to control the execution within execution unit 24. All of the foregoing is, of course, well known in the art. In addition, further details of the operation of the system console 27 in its overall control function in addition to the functions which will be emphasized in the present application may be found in the copending application "Data Processing System" in the names of Amdahl et al., Ser. No. 302,221, filed Oct. 30, 1972 now U.S. Pat. No. 3,840,861, assigned to the present assignee.

In addition, details of the data transfer between main storage 21 and high speed storage unit 26 are disclosed and claimed in a copending patent application entitled "Data Processing System and Method Therefor" in the names of Amdahl and Tobias, Ser. No. 302,229, filed Oct. 30, 1972, now U.S. Pat. No. 3,858,183, assigned to the present assignee.

Figure 1A:
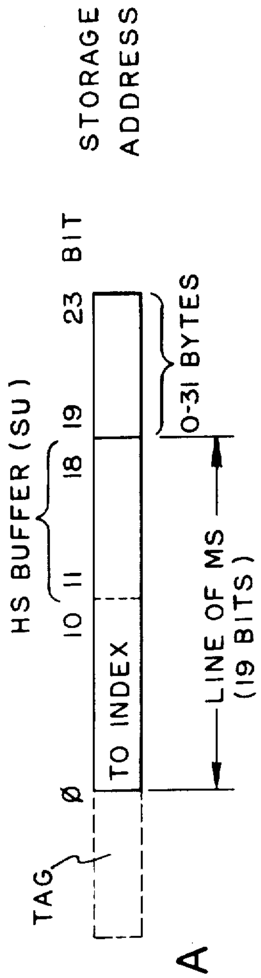
FIG. 1A illustrates the format of the buffer storage address.

FIG. 1A illustrates a typical storage address for main storage 21 which is 24 bits in length. The 0 through 18 bits designate the line of main storage which is desired. Bits 0 through 10 are for indexing purposes, for example, determining whether or not a line of information (which is 32 bytes long) is in the high speed buffer storage unit 26 or is still in main storage 21. Bits 11 through 18 are for the purpose of addressing 1 out of the 256 lines of both the primary and alternate portions of the storage unit 26 and bits 19 to 23 determine the specific initial byte of the 32 byte line to be addressed. Finally, the tag indicated in dashed outline is added to the address to indicate in what manner a line of data was fetched from main storage 21; that is, whether it was requested via channel unit 22, execution unit 24, instruction unit 23, etc.

In general, the data processing system as set out in FIG. 1 is programmable and compatible with the IBM system/370.

Figure 2:
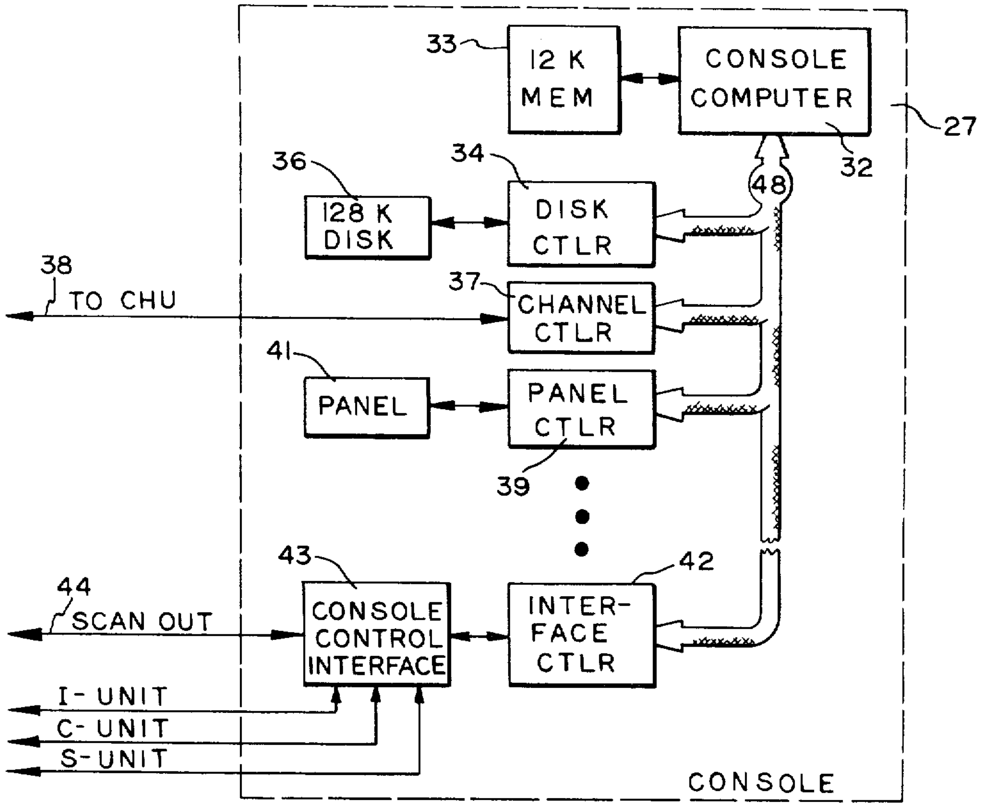
FIG. 2 is a detailed block diagram of the console of FIG. 1.

Referring now to FIG. 2 which shows the details of console 27, as stated above, the system console would normally include a console computer 32 which is termed a minicomputer. Such minicomputer has associated with it a 12K memory 33 along with various control interfaces. These include a disk controller 34 associated with a magnetic disk unit 36, a channel controller 37 which is coupled to the channel of CH unit by a line 38, and a panel controller 39 which interfaces the system console with a control panel 41 which may include, for example, toggle switches to allow the operator to physically modify the preprogrammed function of the console computer 32. An interface controller 42 is coupled to a console control interface unit 43 which interfaces from a data standpoint with the instruction unit, execution unit and storage unit on the lines as indicated and also includes a scan out line 44 for purposes of transferring this data or instructions.

Figure 3:
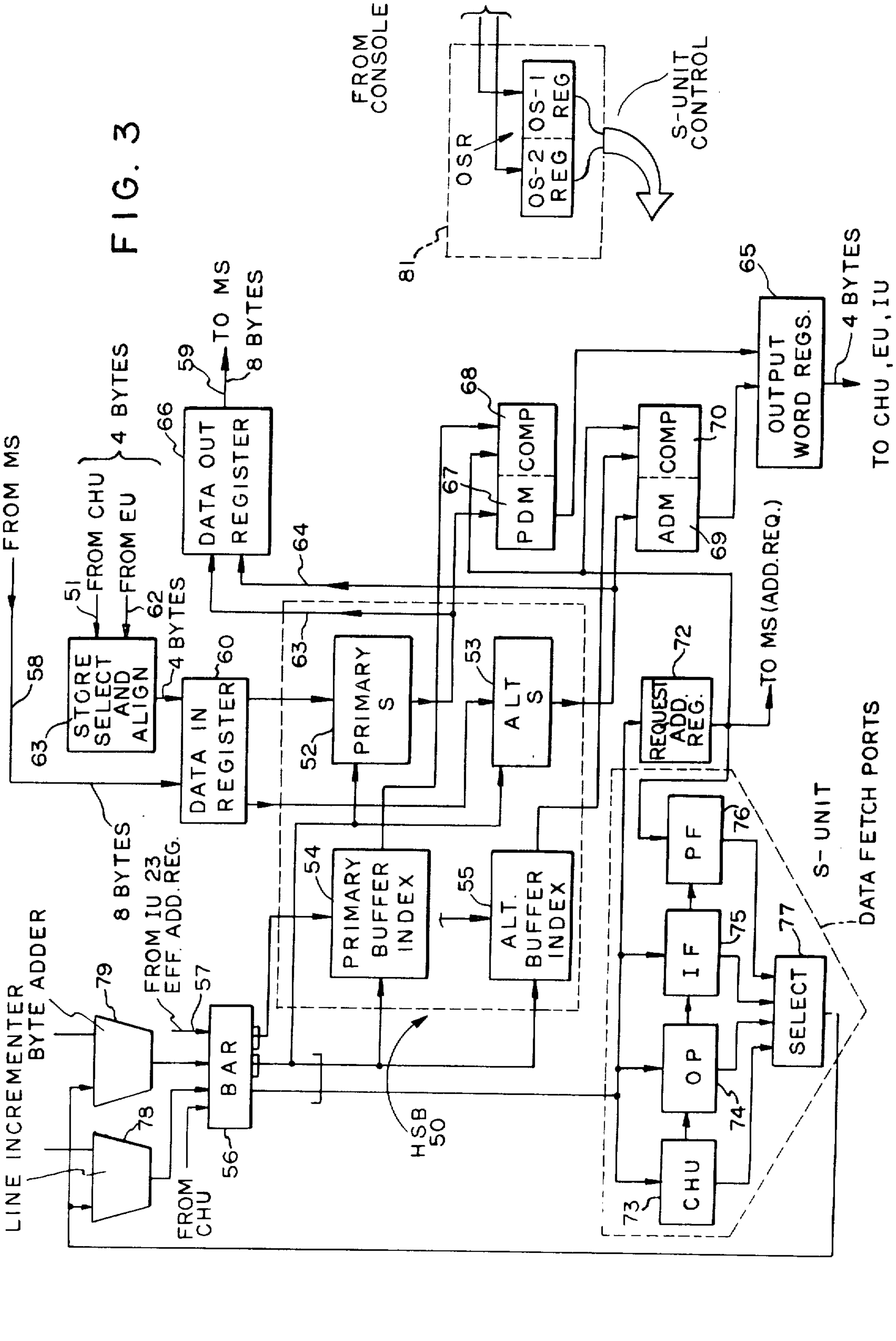
FIG. 3 is a detailed block diagram of the S unit of FIG. 1.

FIG. 3 illustrates the details of the storage unit 26 which includes a high speed buffer (HSB) 50 for storing information and which can be accessed at the high speeds of the clock cycle time of the computer. Such buffer includes indentical 256 line primary storage and alternate storage units 52 and 53 along with associated index units 54 and 55. High speed buffer 50 is addressed by the address in the buffer address register (BAR) 56 which is loaded by an input buss 57 from the effective address register (EAR) of the instruction unit 23 of FIG. 1. BAR 56 can also be loaded from channel unit 22. The information locations accessed in high speed buffer 50 result in the fetching or storing of the corresponding information from or to main storage (MS), the execution unit, the channel unit or the instruction unit.

Communication to MS is via the 8 byte busses 58 and 59. Such communication is discussed in greater detail in the above copending Tobias application. The 8 bytes of data on buss 58 from main storage 21 are coupled to the high speed buffer 50 by a Data In Register 60. For data storage, the data in the Data In Register 60 is directed to either the primary or alternate portions 52, 53 of HSB 50. In addition to data from main storage on buss 58 the high speed buffer 50 also receives data from both the channel unit and execution unit indicated by the four byte input busses 61 and 62. These are processed by a store select and align unit 63 whose function again is more fully disclosed in the above-mentioned Tobias patent application. Data transfer from primary storage 52 and alternate storage 53 to MS occurs on the associated busses 63 and 64 to the data out register 66 which is coupled via buss 59 to main storage. This is on an eight byte basis.

On the other hand, for data requests, communication between the high speed buffer 50 to the CPU and the channel unit is on a 4 byte basis via the output word registers 65. The output word registers include an instruction word register, channel word register and operand word register. Data requests can come from the CHU, IU or the execution unit (EU) via the IU. Registers 55 are connected to primary and alternate storage 52, 53 by a primary data manipulator (PDM) unit 67 which includes an associated comparator 68 and an alternate data manipulator (ADM) unit 69 which also includes an associated comparator 70. The comparators 68 and 70 compare bits 0 through 10 of the request address in the request address register 72 (index of main storage address —FIG. 1A) to the index of the lines stored in primary storage 52 and alternate storage 53, respectively. The results of these comparisons cause either the primary data manipulator 67 output or the alternate data manipulator 69 output to be loaded into the proper output word register 65. This thus means that a line of data in main storage has a predictable location in either primary storage unit 52 or alternate storage unit 53. In addition, as discussed in the above-mentioned Tobias application the data manipulators 67 and 69 shift data around in the proper sequence to assure proper alignment.

The logic units 73, 74, 75 are the data request ports (via the BAR) for the channel unit (CHU), instruction unit (IU), the execution unit (EU). The EU makes its requests via the IU. Data requests from and to the memory unit (MU) or high speed buffer (HSB) can be from any of the above request ports.

Figure 4:
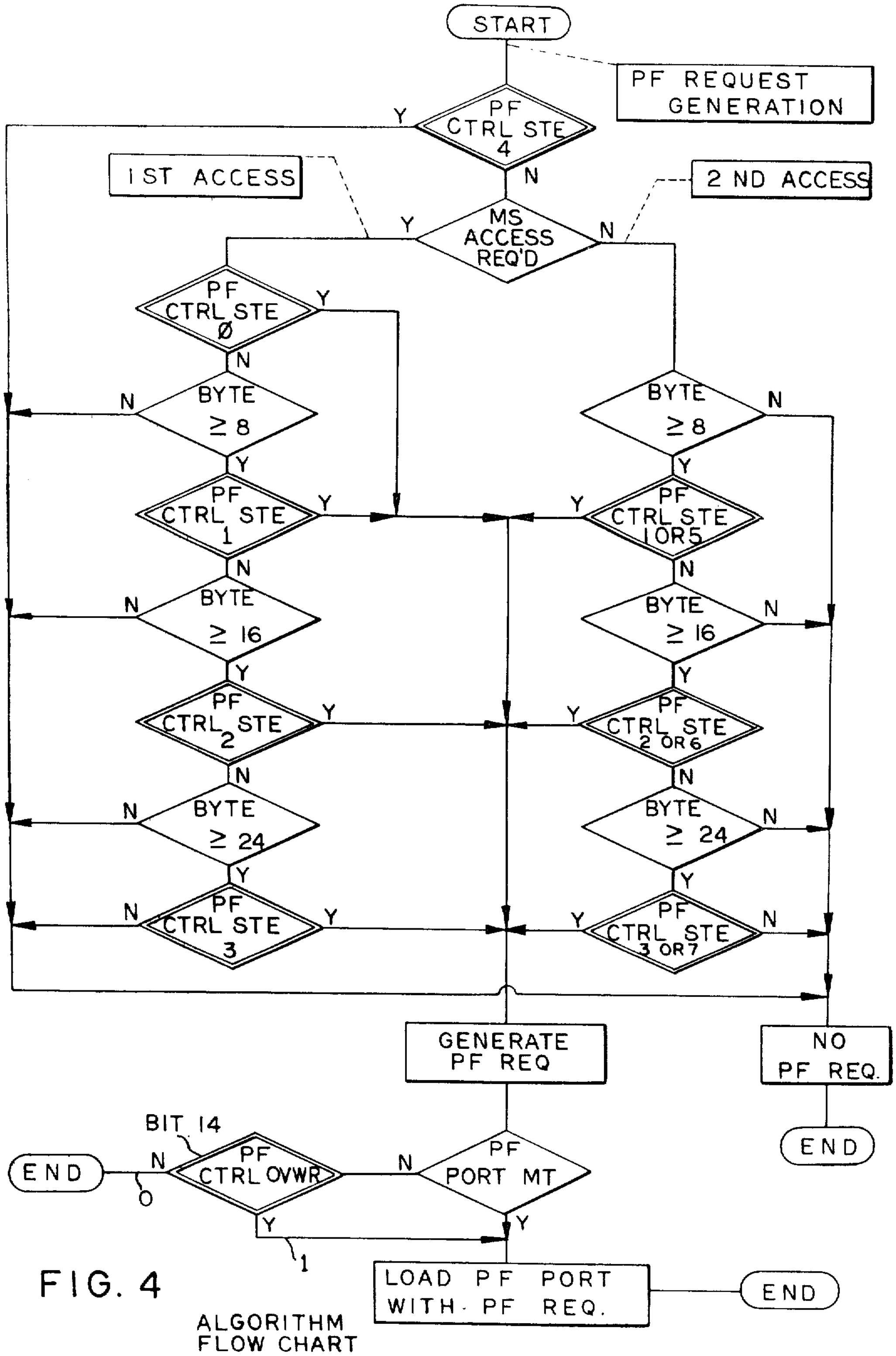
FIG. 4 is a flow chart illustrating an algorithm of the present invention.

PF logic unit 76 controls prefetch requests. The prefetch algorithm is indicated in FIG. 4. The prefetch determination is based on the prefetch algorithm and the data request source as will be discussed in detail below.

The requesting data and prefetch ports, units 73 through 76, are all gated through the select unit 77 which has its output coupled back to the BAR 56 via the line incrementer 78 and byte adder 79.

The line incrementer, upon a prefetch request, selects the next line of data (32 bytes). The byte adder selects and keeps track of the quarter line being selected; however, data transfer to and from MS is always on a full line basis. It thus requires four passes to transfer a full line.

Briefly, in operation, the high-speed buffer 50 is addressed by the buffer address register (BAR) 56. From the buffer address register 56, a portion of the address (the index) is simultaneously gated to the primary buffer index 54 and alternate buffer index 55. The index units 54, 55 store bits 0 through 10 of the buffer address register as illustrated in FIG. 1A. This address is associated with two unique storage locations—one storage in the primary storage 52 and the other in the alternate storage 53. The low-order bits from the BAR 56, bits 11 through 18, are gated directly to the storage units 52 and 53.

If it is a data request from the CHU or IU and the required line of information is in the primary or alternate storage units, the data is then read out from the proper location through the output word registers 65. If the data is not in the primary or alternate storage units 52, 53, it must first be fetched from MS to the HSB where it is then processed through the output word register 65 to the requesting unit. The data prefetch and replace algorithms, infra, describe the transfer of data from MS to the HSB. Registers 73 through 76 are used in conjunction with such fetching. In the case of a prefetch of the next sequential line, the line incrementer 78 will provide the proper address for the prefetching of this line. This is essentially controlled by the prefetch control unit 76. In other words, prefetch is accomplished by the line incrementer 78, incrementing the existing address in BAR 56 to form the full address of the next sequential line in the BAR.

If it is a data store operation and the line of buffer memory addressed is immediately available so that no MS transfers are required, two accesses to the HSB are needed. The first access is to the correct line of the HSB 50 to determine its availability; the second access is used to store the data. If the location contains old data that must be returned to MS, the new data store operation is delayed until the line of old data is transferred to MS. The transfer of data between MS and the HSB is described by the replacement algorithm, infra.

An S-unit control device 81, illustrated in dashed outline, includes the operating state register (OSR) having portions (OS-1 and OS-2) which control the overall operation of the high-speed storage unit. In addition to the OSR, the S-Unit control contains other circuitry not utilized for variable prefetch and control. The operating state register, bits 5 through 14, are the variables of the prefetch control algorithm (the OSR is loaded from the console during supervisory mode). The operating state register is indicated as being coupled to console 27 of FIG. 1. Bits 5 through 14 control function as illustrated in the following table:

| Bit | Function |
|---|---|
| 5 | Channel prefetch A |
| 6 | Channel prefetch B |
| 7 | Channel prefetch C |
| 8 | Operand prefetch A |
| 9 | Operand prefetch B |
| 10 | Operand prefetch C |
| 11 | Instruction prefetch A |
| 12 | Instruction prefetch B |
| 13 | Instruction prefetch C |
| 14 | Prefetch overwrite |

From examination of the table, the channel unit 73, for example, has bits A, B, C or 5, 6 and 7 which will accomplish eight different states or states 0 through 7. Thus, the control algorithm built into the unit 73 which determines the mode of prefetch may be varied in eight different states. These states are as follows:

State 0: Generate a prefetch request for the next sequential line on any reference to the preceding line.

State 1: Generate a prefetch request on any reference to a line if the first reference byte of the initially referenced line is in the last three-fourths of the line. In other words, in a line of 32 bytes the eighth through thirty-first bytes.

State 2: Generate a prefetch request on any reference to a line if the first reference byte is in the last one-half of the line; i.e., bytes 16 through 31.

State 3: Generate a prefetch request on any reference to a line if the first referenced byte is in the last one-fourth of the line; i.e., bytes 24 through 31.

State 4: Disable the prefetch request generation.

State 5: On the second and subsequent access to the line in the HSB 50, generate a prefetch request fir the first reference byte is in the last three-fourths of the line. In other words, there is no generation if it is merely a first access.

State 6: The same as state 5 except last one-half of line.

State 7: The same as state 5 except last one-fourth of line.

FIG. 4 illustrates the algorithm expressed in the foregoing. The step labeled MS access required relates to the first and second accessing of main storage and that decision is determined by whether or not a flip-flop has previously been set in units 73, 74, 75 by a first access. The block labeled prefetch control overwrite (PF CTRL OVWR) relates to the bit 14 of prefetch control unit 76. This unit is a type of priority unit which regulates the priority of the request from the IF, OP and CU units. For example, these units may simultaneously be competing for a prefetch request. Thus, where bit 14 of the prefetch overwrite control register 76 is off or is in a 0 or not state the first prefetch request which exists in the prefetch port is accepted and the others are ignored since the prefetch port is already full. If, however, the bit is set to a 1, each subsequent external prefetch request overwrites the previous request if it has not yet been executed or is capable of being interrupted.

From a more detailed standpoint the prefetch algorithm determines which one-fourth of the line is requested by looking at the two higher order bits of the five bits of the byte address, that is, bits 19 and 20.

Bits 5 through 14 can, of course, be modified by refilling the operating state register 1 from the system console. Moreover, the system console may easily respond to the differing needs of the CPU processing in accordance with the program which is being carried out. Thus, the pre-fetch algorithm may be varied and moreover, this may be done in a manner which is generally transparent to the general programmer of the data processing system of the present invention. Thus, there is dynamic interaction between the minicomputer of the console and the overall operating computer. With the minicomputer analyzing the program being carried out by the main computer the impact on the main computer system is minimized. From a practical standpoint the diagnostic program of the console minicomputer 27 as illustrated in FIG. 2 might typically be accomplished on an experimental basis. For example, if a Fortran compiler program was being run, a typical program could be run with all of the various states of the pre-fetch algorithm being tested; the one which performed best would be chosen. In addition, the invention contemplates manual variation of the pre-fetch algorithm by the computer operator by means of the panel switches on the console. For example, this could be done as discussed above where if a punched card deck was being read then the pre-fetch generation could be disabled. Naturally automation of such a system would be desired.

The foregoing principle of the use of a console computer to vary an algorithm may also be utilized in the case of a replacement algorithm. Specifically, as discussed above, since the high speed buffer is smaller than main storage there may be no room in the high speed buffer at the two possible locations for a line from main storage. Therefore, a line must be chosen which will be replaced. This replacement should preferably be done on information known about the two existing lines the object being to provide the least impact on the operation of the computer system. A line in the high speed buffer storage unit as discussed in connection with FIG. 1A includes a tag portion which includes two bits which indicate whether that line was being used by the channel unit (CU), by the CPU in a problem mode or by the CPU in a supervisory mode.

As shown by the following table listing bits 15 through 20 of the operating state register 1, these are coupled from the console to determine and vary the algorithm.

| Bit | |
|---|---|
| 15 | Enable I/O--CPU differentiation |
| 16 | CPU replace CPU line in HSB |
| 17 | I/O replace I/O line in HSB |
| 18 | Enable SUPR-PROB differentiation |
| 19 | PROB replace PROB line in HSB |
| 20 | SUPR replace SUPR line in HSB |

Figure 5A:
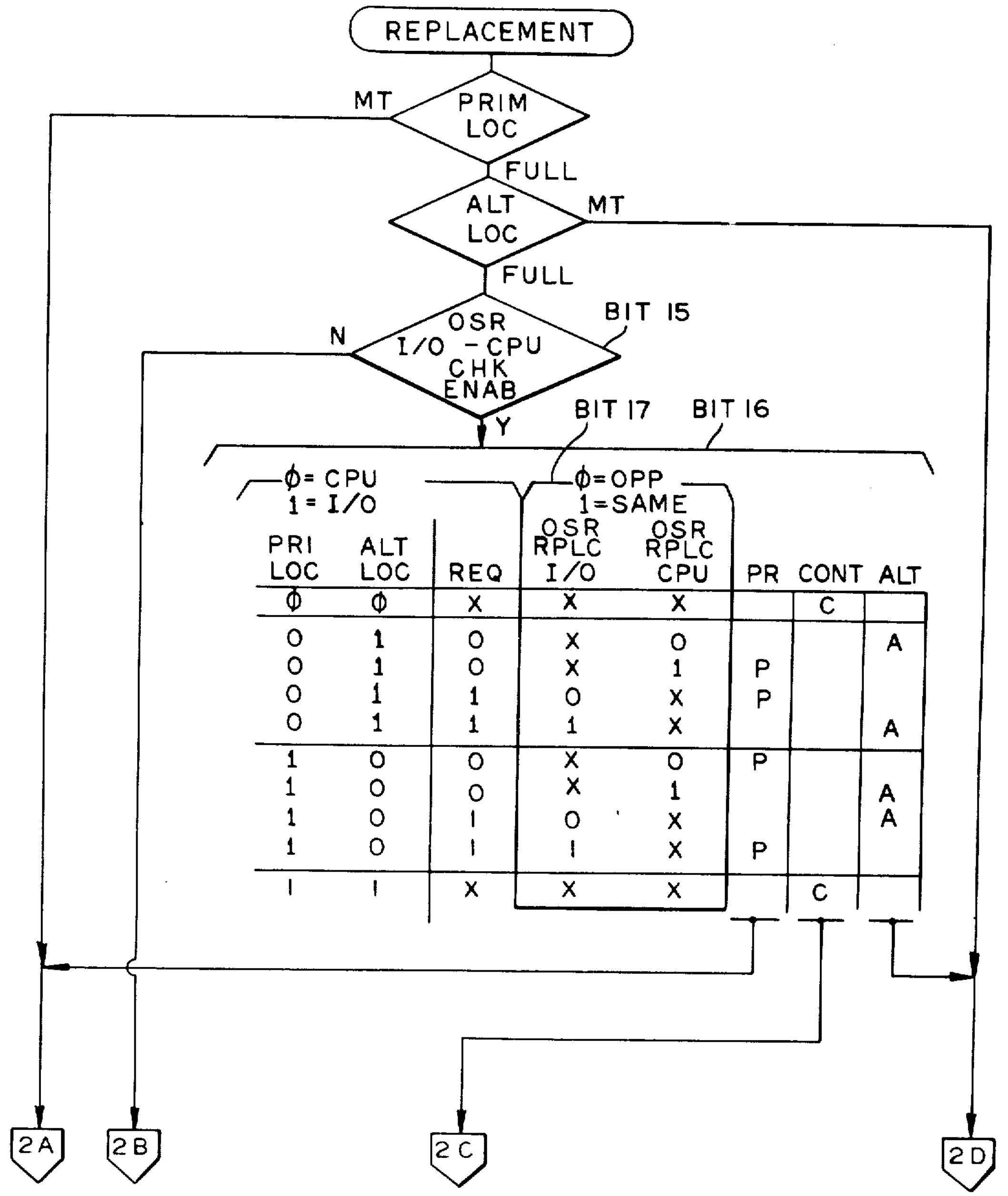
FIGS. 5A and 5B is another flow chart partially tabular in nature illustrating another algorithm of the present invention.
Figure 5B:
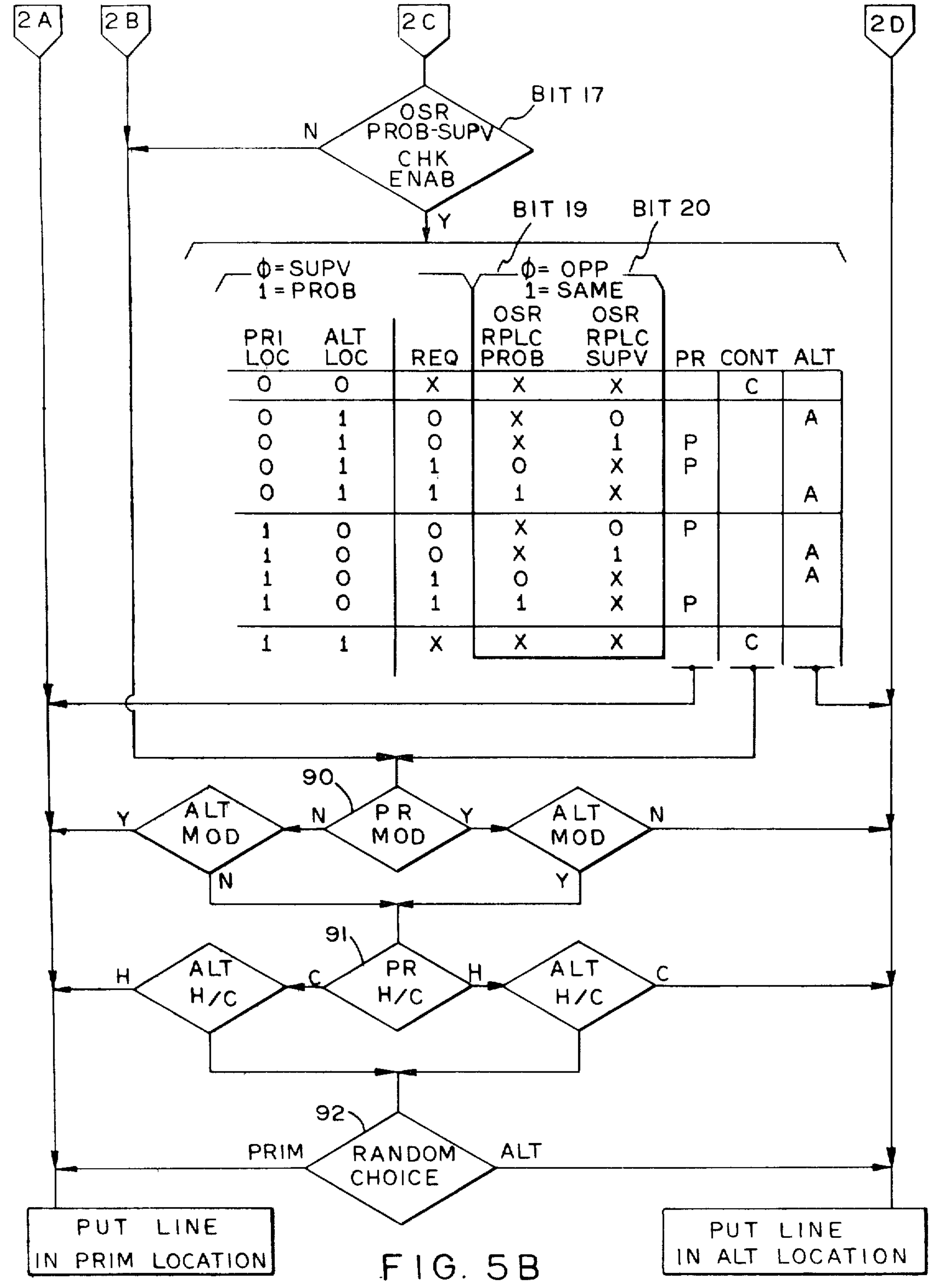

This algorithm is set out in FIGS. 5A and 5B. The bits 15 through 20 are indicated. As illustrated a differentiation is made (bits 15, 16, 17) whether or not to replace an existing CPU line with a new CPU line or an I/O line with a new I/O line; also a differentiation is made (bit 18, 19, 20) between the supervisory and problem mode of the CPU. Lastly, as illustrated in FIG. 5B if none of the above decisions can be made then in a further decision block 90 the tag information of the address determines whether a line is modified or unmodified. If it has been modified, then that line is left in. If this is still not successful, then decision block 91 from the tag information which was the last line to be referenced and this line is retained; this is termed a Hot/Cold (H/C) decision. Lastly, as shown by decision block 92, labeled random choice, a flip-flop is toggled every time a decision is made and this thereby makes a random decision whether to place the line in a primary or alternate location.

Thus, the present invention has provided an improved mode of varying the pre-fetch and replacement algorithms in a data processing system, thus dynamically varying the interaction between main storage and high speed buffer storage of a data processing system. The line of data in the high speed buffer to be replaced (if the primary and alternate are filled and modified) is controlled by the replacement algorithm. The line of data to be prefetched from the Memory Unit and stored in the high speed buffer (HSB) is controlled by pre-fetch algorithms.

I claim:

1. A data processing system comprising, a processing unit, for providing addresses of locations to be accessed, main storage having a plurality of addressable locations, buffer storage having a plurality of addressable locations for coupling said processing unit to said main storage, addressing means for storing a current address for accessing said buffer storage, control means for controlling the sequencing of addresses to said first addressing means for accessing said buffer store, detecting means for detecting the accessing of said buffer storage by said first addressing means to determine if a preselected criteria is met, means, responsive to said detecting means and to said control means, for causing said addressing means to access said buffer storage with an address and at a buffer store location determined in response to said preselected criteria, means for changing said preselected criteria whereby the conditions under which information is to be stored in said buffer storage are altered.

2. A data processing system comprising, a processing unit, for providing addresses of locations to be accessed, main storage having a plurality of addressable locations, buffer storage having a plurality of addressable locations for coupling said processing unit to said main storage, addressing means for storing a current address for accessing said buffer storage, control means for controlling the sequencing of addresses to said first addressing means for accessing said buffer store, detecting means for detecting the accessing of said buffer storage by said first addressing means to determine if a preselected criteria is met, address store means for storing a prefetch address, said address store means connected to said addressing means, means, responsive to said detecting means and to said control means, for gating said prefetch address from said address store means to said addressing means for accessing said buffer storage with said prefetch address when said preselected criteria is met, means for changing said preselected criteria whereby the conditions under which information is to be stored into said buffer storage are altered.

3. A data processing system comprising, a processing unit, for providing addresses of locations to be accessed, main storage having a first plurality of addressable locations, first addressing means for accessing main storage, buffer storage having a second plurality of addressable locations smaller than said first plurality of addressable locations for coupling said processing unit to said main storage, second addressing means for accessing said buffer storage with a current address, control means for controlling the sequencing of addresses to said first addressing means for accessing said buffer store, detecting means for detecting the accessing of said buffer storage by said first addressing means to determine if a preselected criteria is met, address store means for storing a prefetch address for prefetching information from said main storage for storage in said buffer storage, means, responsive to said detecting means and to said control means, for gating said prefetch address from said address store means to said first and second addressing means for accessing said main storage and said buffer storage with said prefetch address when said preselected criteria is met to transfer information from said main storage to said buffer storage, means for changing said preselected criteria whereby the conditions under which information is prefetched to said buffer storage are altered.

4. The system of claim 3 wherein, said control means includes means for forming said addresses as byte addresses and means for sequencing a plurality of contiguous byte addresses in sequencing a line of addresses where each line of addresses includes a predetermined number of byte addresses, said address store means including means for forming said prefetch address as the next contiguous line of addresses after the line of addresses including said current address, said detecting means including means for detecting when said current address is between predetermined ones of said byte addresses, for establishing said preselected criteria as the condition that said current address is between said preselected byte addresses, whereby said control means causes the next contiguous line of addresses to be prefetched from main storage and stored in said buffer storage.

5. The system of claim 3 wherein, said means for changing includes a programmable computer connected for monitoring said data processing system.

6. The system of claim 3 wherein, said detecting means includes means for detecting when said current address is within any quarter of the four quarters which comprise a line of contiguous addresses.

7. The system of claim 1 wherein said detecting means includes means for sensing when said buffer storage is full at current locations addressed by said current address and means for sensing the oldest information in said current locations whereby the oldest information is replaced.

* * * * *